Patented June 26, 1934

1,963,997

UNITED STATES PATENT OFFICE 1,963,997

HYDROGENATION OF ALIPHATIC POLYHYDRIC ALCOHOLS

Arthur Whitney Larchar, Wilmington, Del., assignor to E. I. du Pont de Nemours & Company, Wilmington, Del., a corporation of Delaware No Drawing. Application November 11, 1929, Serial No. 406,530. Renewed August 15, 1933

21 Claims. (Cl. 260—156.5)

This invention relates to the art of producing alcohols, and more particularly to the catalytic hydrogenation and dehydration of polyhydroxy alcohols to form glycols.

It has been proposed to form glycols by subjecting a variety of materials, such as sorbitol, dextrose, sucrose, starch and cellulose to the action of hydrogen in the presence of certain metallic catalysts having a hydrogenating action, such as iron, platinum, and copper. I have conducted experiments and have found that the yield of glycol formed by this method as carried out in the prior art is insignificant due to the fact that these compounds are produced not alone by hydrogenation, but by a combined hydrogenation and dehydration. I have discovered that, in order to obtain a satisfactory yield of glycol, it is advisable to employ a catalyst having both a hydrogenating and a dehydrating effect.

This invention has as an object to provide a catalytic process for converting polyhydroxy alcohols to glycols. Another object is to provide a catalytic process by which a carbohydrate compound may be converted to a glycol. A further object relates to a catalytic process for hydrogenating polyhydric alcohols to produce polyhydric alcohols having a smaller number of carbon atoms under a pressure of at least 2000 lbs./sq. in. and at a temperature of at least 200° C. It is a specific object of the invention to provide a process for converting sorbitol or glycerol directly to 1:2 propylene glycol. Other objects will become apparent as the description proceeds.

These objects are accomplished by the following invention which in its preferred form comprises subjecting polyhydroxy compounds, such as a carbohydrate or one of the polyhydric alcohols to the action of hydrogen at elevated pressure and temperature in the presence of a catalyst having both a hydrogenating and a dehydrating effect.

The following examples of my invention are included merely for purposes of illustration but are not to be regarded as limitations.

*Example 1.*—A solution comprising 150 grams of 90% sorbitol dissolved in 100 grams of water was shaken for a period of 1¾ hours in a suitable reaction tube with 15 grams of a nickel-chromium oxide catalyst made by the partial reduction of nickel chromate and in the presence of hydrogen. The temperature was maintained between 250–275° C. and the hydrogen pressure at 3000 pounds. There was recovered from the tube 255 grams of reaction products. The catalytic material was filtered from the mixture in the reaction tube and the filtrate was fractionally distilled. There was obtained approximately 170 grams of material which came over at 100–102° C., 50 grams of which came over at 187–190° C. and was identified as 1:2 propylene glycol. There was a non-volatile residue amounting to approximately 34 grams which was probably unchanged sorbitol containing some glycerol.

*Example 2.*—A solution of 200 grams of dextrose in 100 grams of water was shaken in the presence of hydrogen at a pressure of 1000 pounds and at a temperature of 150° C. with 15 grams of a nickel-chromium oxide catalyst. After two hours no more hydrogen was absorbed. At this point it can be said that the dextrose had been converted to sorbitol. The temperature was then raised to 275° C. and the hydrogen pressure to 3000 pounds. After about five hours the absorption of hydrogen ceased. The reaction tube was then opened and the catalyst filtered from the liquid material which was then subjected to fractional distillation as in Example 1. It was found that there were present 1:2 propylene glycol and a non-volatile residue which was apparently sorbitol. This residue was redissolved in water and was subjected to the same procedure as the original dextrose solution. The product obtained from the second treatment contained more 1:2 propylene glycol and a non-volatile residue. 88 grams of propylene glycol were formed, representing a yield of 44%, based on the original dextrose.

*Example 3.*—250 grams of glycerol were shaken with a nickel-chromium oxide catalyst in the presence of hydrogen under a pressure of 3000 pounds and at a temperature of 275° C. The clear solution obtained by filtering the mixture removed from the reaction tube upon the completion of the reaction, amounting to 230 grams, yielded upon distillation, 13% propanol, 25% water, 53% 1:2 propylene glycol and 8% of a high boiling residue.

It will be apparent from the above examples that the chemical reactions involved in my process comprise both hydrogenation and the subsequent dehydration of the product formed as a result of the hydrogenation. The preferred catalyst must, therefore, be capable of promoting both reactions.

A suitable nickel catalyst as used in the above reactions may be prepared in the following manner. A solution containing one mol of nickel nitrate dissolved in two liters of water is heated to boiling and treated with a solution containing an equimolecular quantity of ammonium bichromate. Ammonium hydroxide is added with stirring until the mixture reacts slightly alkaline. The brick red precipitate of nickel chromate is filtered, thoroughly washed, dried, and partially reduced with hydrogen at 500–550° C. The reduced catalyst contains about 40% of elementary nickel and possesses a high activity in the liquid phase hydrogenation and dehydration of polyhydroxy alcohols.

While in the above examples I have disclosed the use of a nickel-chromium oxide catalyst, there are a number of catalyst combinations which may be effectively used in my process. The principal requisite of the preferred catalyst is that it must contain both a hydrogenating and a dehydrating component. As examples of effective hydrogenating materials other than nickel may be mentioned copper, iron and cobalt, when combined with dehydrating oxides, such as those of chromium, aluminum, tungsten, molybdenum, uranium and thorium, or when in the form of dehydrating salts of such acids as boric, phosphoric and sulphuric.

In general, it may be stated that the most effective mixed catalysts are prepared by methods giving the most intimate association of the various constituents. Although I have illustrated one satisfactory method of preparation of the catalyst, I may employ other methods, if desired. For example, I may co-precipitate an oxide of a hydrogenating metal and a dehydrating oxide.

The hydrogenation and dehydration reactions of my process may be carried out in any apparatus which will insure satisfactory contact between the catalyst, hydrogen, and the materials treated. Although I have described a batch process in which the materials are agitated together in a suitable container, the process may be made continuous by pumping the solution and gas over a suitable supporting catalyst.

While in several of the examples I have described the use of aqueous solutions of the material to be treated, it is to be understood that the presence of water is not essential to the successful operation of the process, but the materials are brought into solution merely for convenience in handling and to bring them into more intimate contact with the catalytic material.

The pressures and temperatures which can be used may be varied within wide limits. It is to be noted, however, that two distinct reactions are involved in the conversion of any given polyhydroxy compound to the desired glycol, namely, hydrogenation and dehydration.

In order to accomplish hydrogenation, although I prefer to use pressures of 1000–2000 pounds per square inch, I may use pressures as low as 100 pounds. The upper limit of pressure is determined only by the strength of the apparatus in which the reaction is carried out. The temperature must be at least 100° C. and may, for hydrogenation alone, be as high as 200° C. or even higher.

Dehydration will not occur to an appreciable extent below a temperature of 200° C. or a pressure of 2000 pounds. The operative temperatures for this reaction may be stated to be in the range of from 200–300° C., while the pressure may be of any desired value above 2000 pounds.

Although I have for purposes of illustration described the treatment of certain selected raw materials, including dextrose, sorbitol and glycerol, my invention is not limited to the production of alcohols from these specific substances, but applies also to the treatment of other polyhydroxy compounds, such as starch, cellulose, dimethyl and diethyl cellulose, and other compounds of like nature.

It will be apparent that my invention possesses many advantages, one of the principal of which is that certain of the glycols which are very expensive and practically unobtainable at present, may be prepared from cheap and readily available materials, such as starch and sucrose. For example, 1:2 propylene glycol can be readily prepared from glucose. As is well known, the glycols can be readily converted into the corresponding ethers and esters, analogous to those made from ethylene glycol, and these are valuable as lacquer solvents and softeners. Furthermore, certain of the glycols, for example, 1:2 propylene glycol, may be used as anti-freeze compounds for automobile radiators.

No claim is made herein to the method of producing the reduced nickel catalyst set forth above, inasmuch as I am not the inventor of this method.

As many apparent and widely different embodiments of this invention may be made without departing from the spirit and scope thereof, it is to be understood that I do not limit myself to the specific embodiments thereof except as defined in the appended claims.

I claim:

1. The process which comprises subjecting an aliphatic polyhydric alcohol having more than two carbon atoms to a temperature of at least 200° C. and a pressure of at least 2000 pounds per square inch in the presence of hydrogen and a catalyst containing a hydrogenating and a dehydrating component.

2. The process of claim 1 in which the heating is carried out at a temperature of 200–275° C.

3. The process of claim 1 in which the reaction is carried out at a pressure of approximately 3000 pounds per square inch.

4. The process of claim 1 in which the catalyst contains a hydrogenating metal and a dehydrating oxide.

5. The process of claim 1 in which the catalyst is a nickel-chromium oxide catalyst prepared by the reduction of nickel chromate.

6. The process of claim 1 in which the catalyst contains a hydrogenating metal and chromium oxide.

7. The process of claim 1 in which the catalyst is prepared by the partial reduction of a hydrogenating metal chromate.

8. The process of claim 1 in which the alcohol undergoing conversion is dissolved in solvent.

9. The process of claim 1 in which the alcohol undergoing conversion is dissolved in water.

10. The process of claim 1 in which the alcohol undergoing conversion is a saturated aliphatic alcohol.

11. The process of claim 1 in which the alcohol undergoing conversion is a saturated straight chain aliphatic alcohol.

12. The process which comprises subjecting an aliphatic polyhydric alcohol having more than two carbon atoms and more than two hydroxyl groups to a temperature of at least 200° C. and a pressure of at least 2000 pounds per square inch in the presence of hydrogen and a catalyst containing a hydrogenating and a dehydrating component whereby to convert said alcohol to another alcohol containing a less number of hydroxyl groups.

13. The process of claim 12 in which the alcohol undergoing conversion is an aliphatic alcohol, the oxygen content of which is entirely in the form of hydroxyl groups.

14. The process of claim 12 in which the polyhydric alcohol undergoing conversion is glycerol.

15. The process of forming 1, 2 propylene glycol which comprises subjecting an aqueous solution of sorbitol to the combined hydrogenating and dehydrating action of a nickel-chromium oxide catalyst prepared by the reduction of nickel chromate, in the presence of hydrogen under a pressure of at least 2000 pounds per square inch, and at a temperature of 200–275° C.

16. The process of preparing glycerol which comprises subjecting an aqueous solution of sorbitol to the combined hydogenating and dehydrating action of a catalyst comprising a mixture of hydrogenating and dehydrating components, in the presence of hydrogen at a pressure of at least 2000 pounds per square inch and a temperature of at least 200° C.

17. The process of forming a glycol which comprises heating an aliphatic polyhydric alcohol containing more than two carbon atoms and more than two hydroxyl groups at a temperature of at least 200° C. under a pressure of at least 2000 pounds per square inch in the presence of hydrogen and a catalyst containing a hydrogenating and a dehydrating component.

18. The process which comprises subjecting an aliphatic polyhydric alcohol having more than two carbon atoms and more than two hydroxyl groups to a temperature of at least 200° C. and a pressure of at least 2000 pounds per square inch in the presence of hydrogen and a hydrogenating-dehydrating catalyst.

19. The process which comprises subjecting a carbohydrate to a temperature of at least 100° C. and a pressure of at least 100 pounds per square inch in the presence of hydrogen and a hydrogenating catalyst whereby to convert said carbohydrate to a corresponding polyhydric alcohol, then subjecting the reaction product to a temperature of at least 200° C. and a pressure of at least 2000 pounds per square inch in the presence of hydrogen and a hydrogenating-dehydrating catalyst.

20. In a process for hydrogenating an aliphatic polyhydric alcohol to produce a polyhydric alcohol having a smaller number of carbon atoms, the step which comprises contacting said first named alcohol, in the liquid phase, with a hydrogenating catalyst in the presence of hydrogen at a temperature of at least 200° C. and under a pressure of at least 2000 lbs/sq. in.

21. In a process for hydrogenating an aliphatic polyhydric alcohol to produce a polyhydric alcohol having a smaller number of carbon atoms, the step which comprises passing said first named alcohol, in the liquid phase, over a hydrogenating catalyst in the presence of hydrogen at a temperature of at least 200° C. and under a pressure of at least 2000 lbs/sq. in.

ARTHUR W. LARCHAR.